United States Patent [19]
Snyder

[11] Patent Number: 6,005,497
[45] Date of Patent: Dec. 21, 1999

[54] POWER CONTROL LATCH

[75] Inventor: Thomas D. Snyder, Raleigh, N.C.

[73] Assignee: Ericsson Inc., Research Park, N.C.

[21] Appl. No.: 08/957,876

[22] Filed: Oct. 20, 1997

[51] Int. Cl.[6] .................................................. H03K 17/94
[52] U.S. Cl. ........................... 341/22; 361/680; 400/682; 364/708.1; 345/168; 200/506
[58] Field of Search ................ 341/22; 361/680, 361/681; 400/489, 682; 364/708.1; 345/168, 169; 200/61.19, 506; 439/188

[56] References Cited

U.S. PATENT DOCUMENTS

| | | | |
|---|---|---|---|
| 5,237,488 | 8/1993 | Moser et al. | 361/681 |
| 5,424,728 | 6/1995 | Keyboard | 341/22 |
| 5,677,827 | 10/1997 | Yoshioka et al. | 361/680 |
| 5,841,635 | 11/1998 | Sadler et al. | 345/168 |

*Primary Examiner*—Michael Horabik
*Assistant Examiner*—Timothy Edwards, Jr.
*Attorney, Agent, or Firm*—David K. Purks

[57] ABSTRACT

A power control latch which is connected to an electronic device having first and second parts which are movable relative to each other between a first position and a second position. The power control latch includes first and second electrically conductive members and a nonconductive member. The first and second electrically conductive members are connected to the first part of the electronic device and the nonconductive member is connected to, and extends outwardly from, the second part. When the first and second parts of the electronic device are in the first position, the first and second electrically conductive members are electrically connected to conduct power. When the first and second parts of the electronic device are in the second position, the nonconductive member extends between the first and second conductive members and prevents electrical connection therebetween.

11 Claims, 5 Drawing Sheets

6,005,497

POWER CONTROL LATCH

FIELD OF THE INVENTION

The present invention relates generally to power control devices and, more particularly, to a power control latch for use in a split keyboard which conducts power when the keyboard is in a first position and prevents conduction of power when the keyboard is in a second position.

BACKGROUND OF THE INVENTION

Split keyboards for computer terminals, in which a conventional keyboard is divided into a plurality of cooperating sections with keys, are known and are desirable for many reasons. The cooperating sections of the keyboard can be folded relative to each other to occupy a small space for storage, such as with a laptop or palmtop computer, and can be relatively positioned to provide comfort to a user during operation of the keyboard. U.S. Pat. No. 5,424,728 to Goldstein and U.S. Patent Application No. (Not Yet Assigned) to Kurokawa et al., Attorney Docket No. 8194-116 and filed Sep. 15, 1997, both disclose split keyboards having mutually detachable or pivotable keyboard sections.

Conventional keyboards can include a power control key which toggles On/Off the flow of power in the keyboard to electrical circuitry, such as to circuits for wireless communication with a computer, or to an attached computer. Accidental actuation of the power key is particularly troublesome for wireless split keyboards which tend to be moved about while stored and where a battery provides a limited power supply life for keyboard circuitry, such as for wireless communication circuitry. Power control keys have been recessed in the keyboard to minimize any accidental actuation of power.

SUMMARY OF THE INVENTION

Accordingly, it is an object of the present invention to provide a power control latch which prevents accidental actuation of power.

It is another object of the present invention for the power control latch to conduct power when the parts of the device to which it is connected are in a first relative position and to prevent conduction of power when the parts are in a second relative position.

It is yet another object of the present invention for the power control latch, when connected to a split keyboard having movable keyboard elements, to conduct power when the keyboard is open and to prevent conduction of power when the keyboard is closed.

It is a further object of the present invention for the power control latch to retain the parts of the device or keyboard in a closed position.

These and other objects are addressed by a power control latch which can be used with an electronic device which has first and second parts that can be moved relative to each other between first and second positions. The power control latch includes first and second conductive members and a nonconductive member.

The first and second conductive members are connected to the first part of the device in close proximity to each other. The second conductive member is resiliently biased toward the first conductive member such that a portion of the first and second conductive members are electrically connected when the first and second parts of the device are in the first position. The nonconductive member is connected to and extends sufficiently outwardly from the second part to extend between the first and second conductive members and prevent electrical connection therebetween when the parts are in the second position.

In another aspect of the present invention, the power control latch is connected to a keyboard that includes first and second keyboard elements connected to a rotatable coupler which allows the first and second keyboard elements to be pivoted between an open position and a closed position. The first and second conductive members are connected to the first keyboard element and the nonconductive member extends outwardly from the second keyboard element. In the open position of the keyboard elements, the second conductive member is resiliently biased toward the first conductive member so that a portion of the first and second conductive members are electrically connected. In the closed position of the keyboard elements, the nonconductive member extends between the first and second conductive members to prevent electrical connection therebetween.

In this manner, the flow of power through the power control latch is actuated by the relative position of the parts of the device or keyboard. For a split keyboard, the power control latch conducts power when the keyboard is open and prevents power conduction when the keyboard is closed. Accidental power actuation is avoided while the keyboard is closed, such as when the keyboard is stored in a briefcase. Moreover, power conduction is automatically halted when the keyboard is closed and is initiated when the keyboard is opened.

In further embodiments, the power control latch is adapted to resist separation of the keyboard elements when the keyboard is closed, thereby facilitating storage of the keyboard.

BRIEF DESCRIPTION OF THE DRAWINGS

For a more complete understanding of the present invention and the further advantages thereof, reference is now made to the following Detailed Description, taken in conjunction with the Drawings, in which.

DETAILED DESCRIPTION OF THE INVENTION

Figure 1:
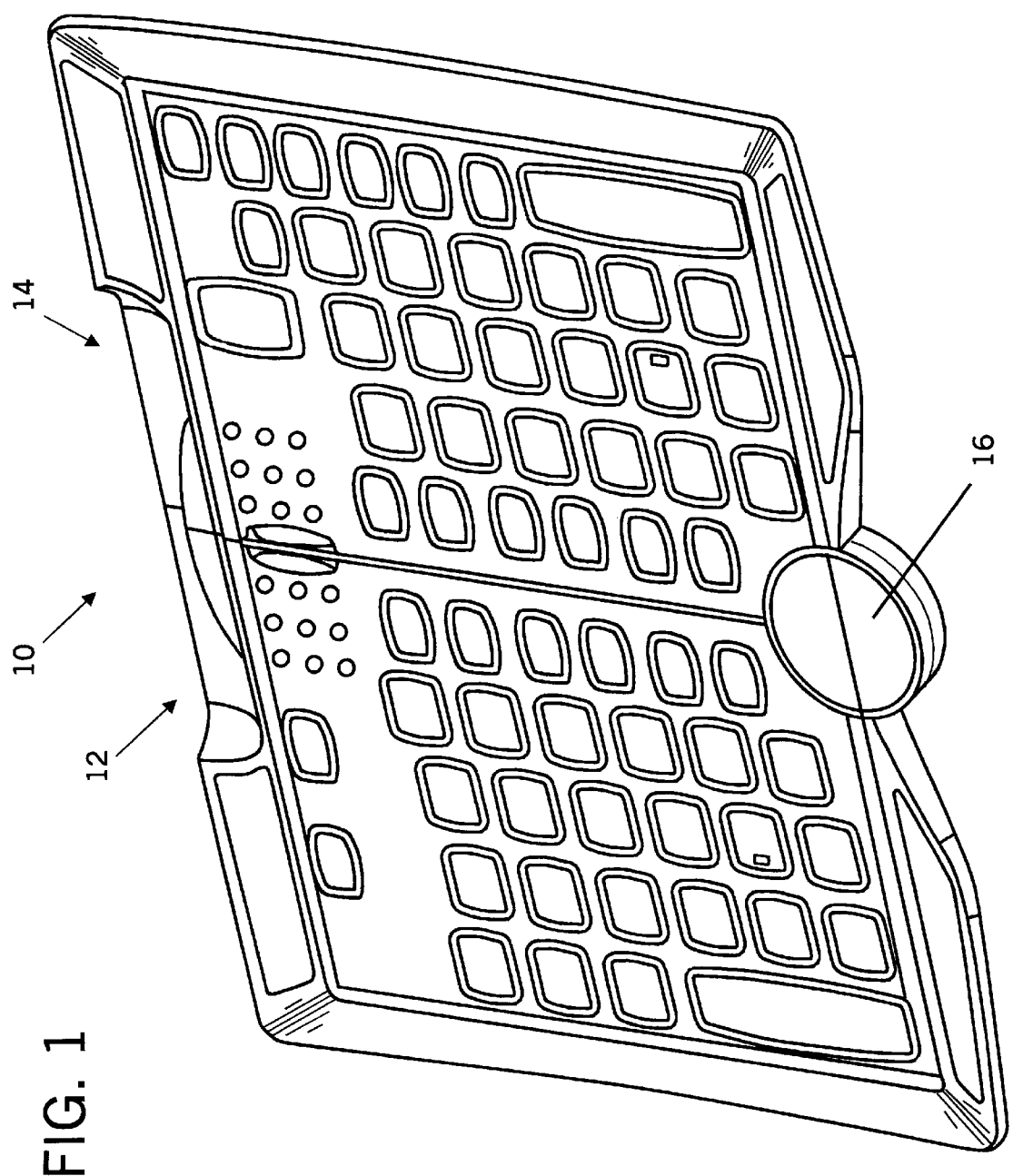
FIG. 1 is a plan view of a split keyboard which is in a closed configuration.
Figure 2:
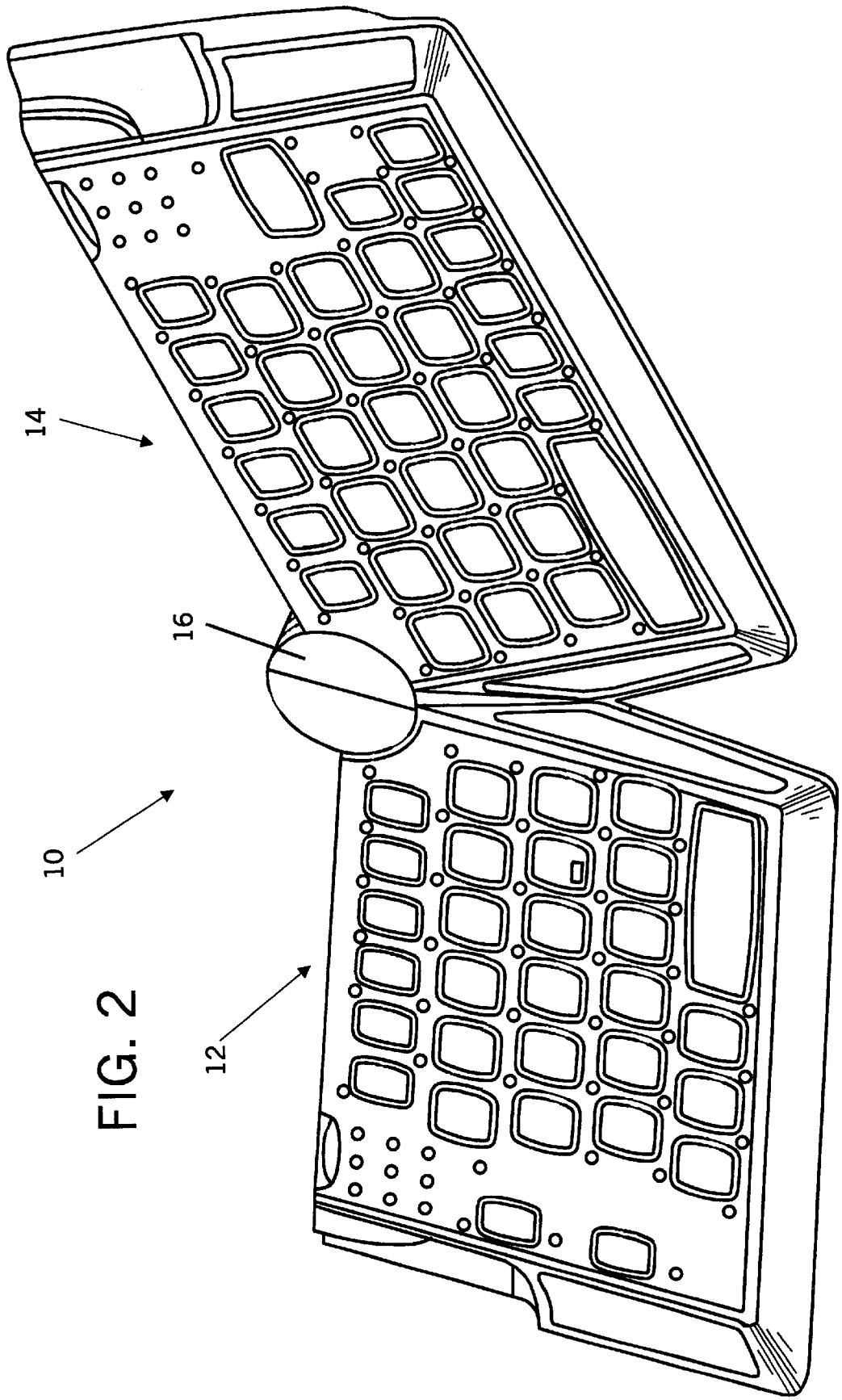
FIG. 2 is a plan view of the keyboard shown in FIG. 1 which is in a fully open configuration.

A wireless split keyboard 10 in a fully-closed position is shown in FIG. 1. The dimensions of the keyboard 10 can be suitably selected to allow the keyboard 10 to be stored within a relatively small area, such as with a portable laptop computer, palmtop computer, or cellular terminal. The keyboard includes left and right keyboard element 12 and 14, respectively. A pivotal coupler 16 connects the left and right keyboard elements 12 and 14 and enables the elements 12 and 14 to be angularly displaced relative to each other. The keyboard 10 is shown in a fully open position in FIG. 2 and is shown in FIG. 3 in a partially open position with keys and upper cover removed.

Figure 3:
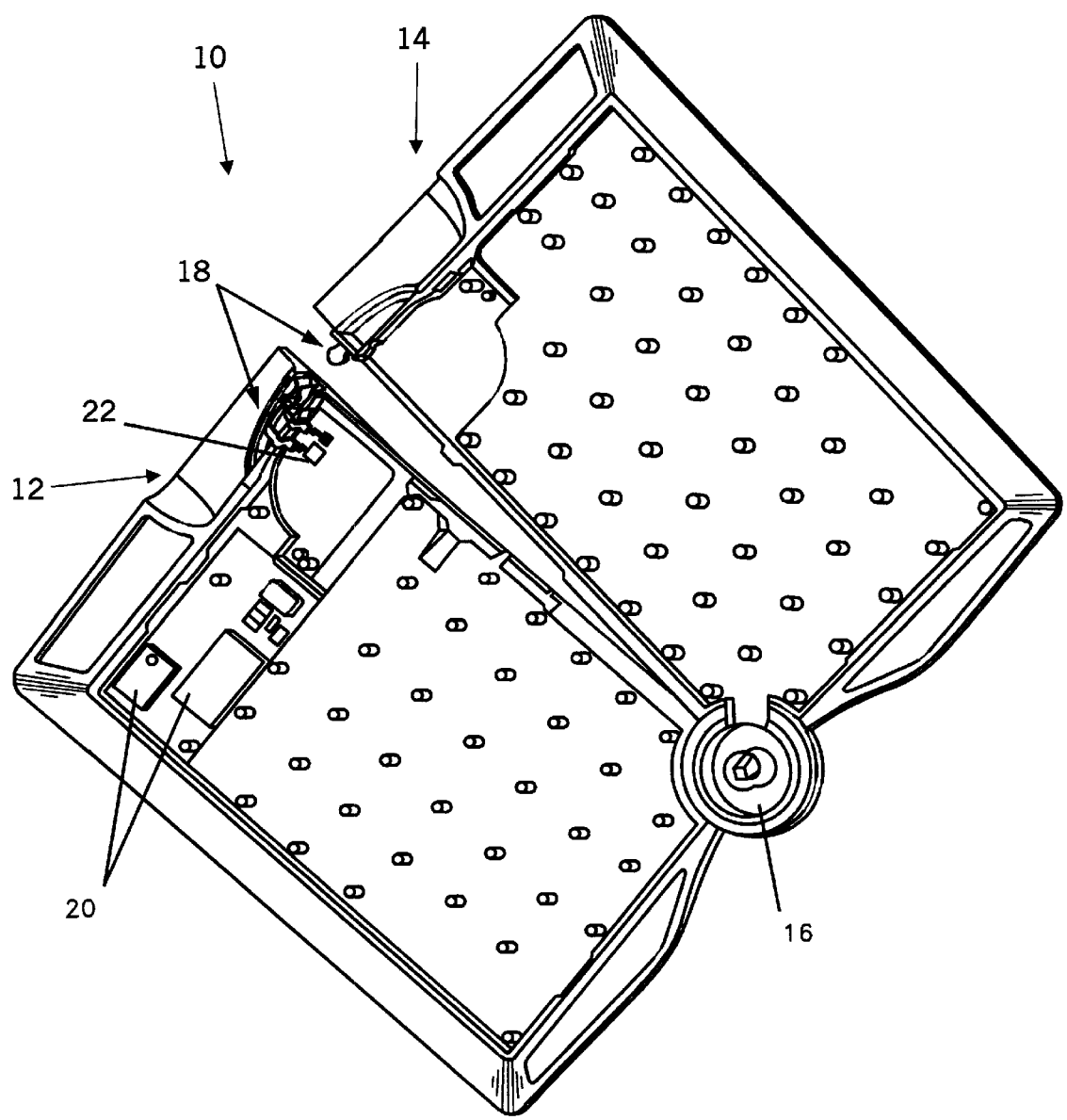
FIG. 3 is a plan view of the keyboard shown in FIG. 1 which is in a partially open configuration and has an upper cover and keys removed to reveal the power control latch according to the present invention.

Referring to FIG. 3, the keyboard 10 includes electrical components 20, such as a keyboard decoder and infra-red communication circuitry which transmits any key actuations to a remotely located computer, a battery 22, and a power control latch 18. The power control latch 18 controls the flow of power from the battery 22 to the electrical components 20 and secures the keyboard elements 12 and 14 together during storage (i.e. closed position in FIG. 1). The keyboard 10 can include further electrical components which are powered independently of the power control latch 18, such as for components which are to be continuously powered or selectively powered by another power switch.

Figure 4:
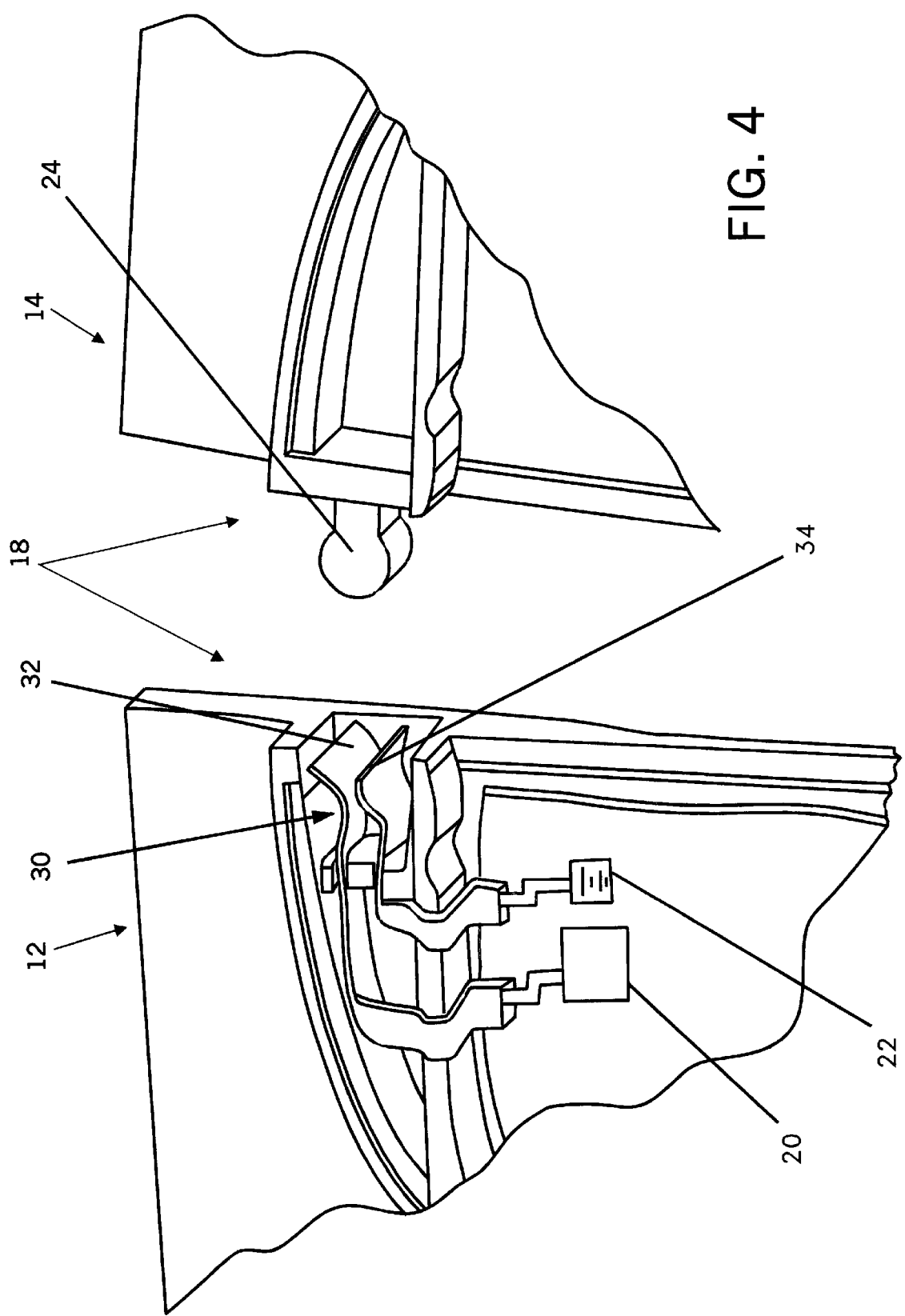
FIG. 4 is an enlarged view of the power control latch shown in FIG. 3.

Referring to FIG. 4 which shows a sectional view of the keyboard 10 in FIG. 3, the power control latch 18 includes a latch member 24 which extends outwardly from keyboard element 14 and a latch spring 30 which is connected to keyboard element 12. The latch spring 30 includes opposing leaf springs 32 and 34 which releasably mate with the latch member 24.

The leaf springs 32 and 34 are formed from a resilient conductive material (e.g., metal). Leaf spring 34 is connected to the battery 22 to receive power therefrom while leaf spring 32 is electrically connected to the electrical components 20 to conduct power thereto. The leaf springs 32 and 34 are resiliently biased to contact each other and, thereby, form a closed circuit between the battery 22 and electrical components 20 when the keyboard elements 12 and 14 are angularly displaced a predetermined angle. The The latch member 24 is formed from a nonconductive material (e.g., plastic) which, when inserted between the leaf springs 32 and 34, prevents the flow of power from the battery 22 to the electrical components 20. The leaf springs 32 and 34 provide a clamping force on an enlarged end of the latch member 24 to resist separation of the latch member 24 from the latch spring 30.

In this manner, when the keyboard elements 12 and 14 abut in a closed configuration for storage, as shown in FIG. 1, the latch member 24 mates with the latch spring 30 to prevent the flow of power from the battery 22 to the electrical components 20 and to retain the keyboard elements 12 and 14 in the closed configuration. In contrast, when the keyboard elements 12 and 14 are angularly displaced from each other, the latch member 24 is withdrawn from the latch spring 30 and power flows from the battery 22 to the electrical components 20.

Figure 5:
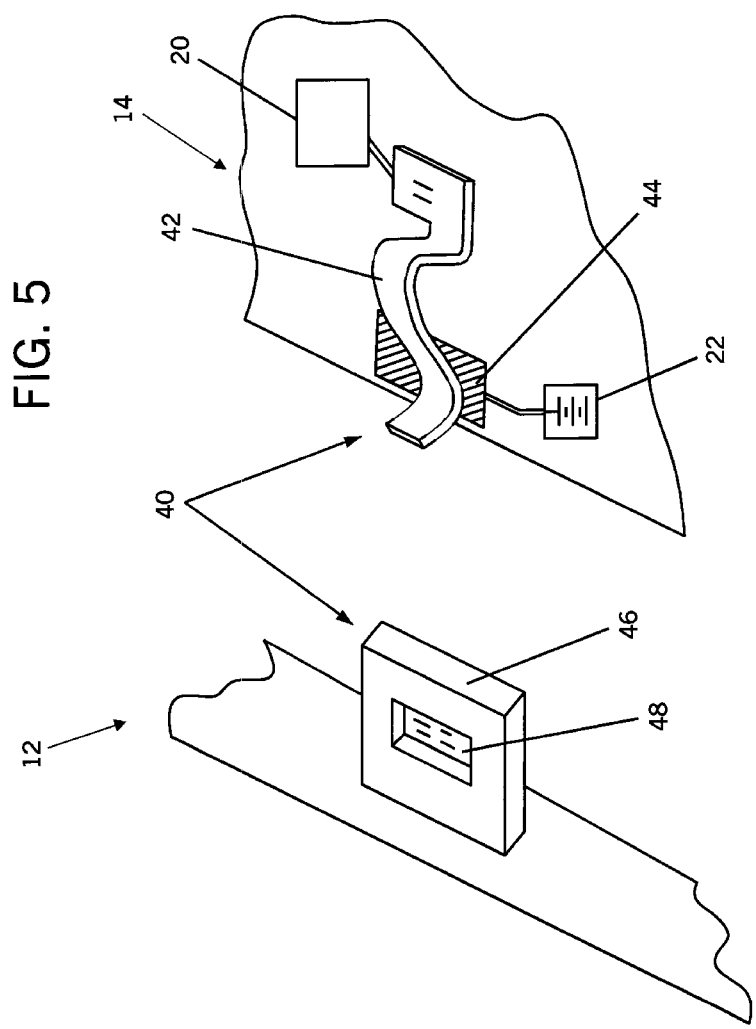
FIG. 5 is an enlarged view of another embodiment of a power control latch for use in the keyboard shown in FIG. 1.

Another embodiment of a power control latch 40 is shown in FIG. 5. The power control latch 40 includes a conductive leaf spring 42 and conductive contact pad 44, both of which are connected to the keyboard element 14, and a nonconductive latch member 46 which extends outwardly from the keyboard element 12. The leaf spring 42 and the contact pad 44 are connected to the electrical components 20 and battery 22, respectively.

With the keyboard elements 12 and 14 angularly displaced relative to each other (i.e. open configuration as shown in FIG. 5), the spring 42 contacts the pad 44 enabling power to flow from the battery 22 to the electrical components 20. In contrast, with keyboard elements 12 and 14 abutted (i.e. closed configuration as shown in FIG. 1) the latch member 46 electrically isolates the leaf spring 42 from the contact pad 41 and prevents power from flowing between the battery 22 and the electrical components 20. A recessed channel 48 is defined in the latch member 46 to engage the leaf spring and resist separation of the keyboard elements 12 and 14 when the keyboard 10 is closed.

As can be appreciated from the preceding discussion, the power control latch conducts power when the keyboard is open and prevents power conduction when the keyboard is closed, thereby avoiding any accidental power actuation while the keyboard is closed, such as when the keyboard is stored in a briefcase. Moreover, power conduction is automatically halted when the keyboard is closed and is automatically initiated when the keyboard is opened. Additionally, the power control latch resists separation of the keyboard elements when the keyboard is closed, thereby facilitating storage of the keyboard.

While the invention has been described in connection with what is presently considered to be the preferred embodiment, it is to be understood that the invention is not to be limited to the disclosed embodiment, but to the contrary, is intended to cover various modifications and equivalent arrangements included within the spirit and scope of the appended claims. It would be appreciated by one who is skilled the art, after considering the present invention, that the power control latch can be used to actuate the flow of power through any electronic device having movable parts. For example, the power control device could enable/halt power flow in response to opening/closing a flip cover on a phone, laptop computer, alarm clock, or other electronic device.

What is claimed is:

1. A power control latch which is connected to an electronic device having a first part and a second part, where the first and second parts can be moved between a first position and a different second position relative to each other, the power control latch comprising:

a first electrically conductive member which is connected to the first part of the electronic device;

a second electrically conductive member which is connected to the first part of the electronic device in close proximity to the first conductive member and resiliently biased toward the first conductive member such that a portion of the first and second conductive members are electrically connected when the first and second parts of the electronic device are in the first position; and a nonconductive member which is connected to and extends sufficiently outwardly from the second part of the electronic device to extend between the first and second conductive members and prevent electrical connection therebetween when the first and second parts of the electronic device are in the second position.

2. The power control latch according to claim 1, wherein: the first and second conductive members are opposed leaf springs.

3. The power control latch according to claim 2, wherein: the nonconductive member is connected at one end to the second part of the electronic device and is enlarged along a portion of the other end; and the first and second conductive members are each connected at one end to the first part of the electronic device and extend toward each other along a portion of the other end of the first and second conductive members to receive and resiliently retain the enlarged portion of the nonconductive member.

4. The power control latch according to claim 1, wherein: the first conductive member is a conductive pad; and the second conductive member is a leaf spring which extends toward the conductive pad.

5. The power control latch according to claim 4, wherein: a recessed channel is defined in the nonconductive member; and an end portion of the second conductive member releasably engages the recessed channel in the nonconductive member.

6. A keyboard, comprising:

a first keyboard element including a first set of keys;

a second keyboard element including a second set of keys, wherein the first and second keyboard elements are movable relative to each other between an open position and a closed position;

a first electrically conductive member which is connected to the first keyboard element;

a second electrically conductive member which is connected to the first keyboard element in close proximity to the first conductive member and resiliently biased toward the first conductive member such that a portion of the first and second conductive members are electrically connected when the first and second keyboard elements are in the open position; and a nonconductive member which is connected to and extends sufficiently outwardly from the second keyboard element to extend between the first and second conductive members and prevent electrical connection therebetween when the first and second keyboard elements are in the closed position.

7. The keyboard according to claim 6, further comprising:

a coupler rotatably connecting the first keyboard element to the second keyboard element such that the first and second keyboard elements are adjusted between the open position and the closed position by pivoting the first and second keyboard elements about the coupler.

8. The keyboard according to claim 6, wherein:

the first and second conductive members are opposed leaf springs.

9. The keyboard according to claim 8, wherein:

the nonconductive member is connected at one end to the second keyboard element and is enlarged along a portion of the other end; and the first and second conductive members are each connected at one end to the first keyboard element and extend toward each other along a portion of the other end of the first and second conductive members to receive and resiliently retain the enlarged portion of the nonconductive member.

10. The keyboard according to claim 6, wherein:

the first conductive member is a conductive pad; and the second conductive member is a leaf spring which extends toward the conductive pad.

11. The keyboard according to claim 10, wherein:

a recessed channel is defined in the nonconductive member; and an end portion of the second conductive member releasably engages the recessed channel in the nonconductive member.

* * * * *